(12) United States Patent
Nikolov et al.

(10) Patent No.: US 7,050,233 B2
(45) Date of Patent: May 23, 2006

(54) PRECISION PHASE RETARDATION DEVICES AND METHOD OF MAKING SAME

(75) Inventors: Anguel Nikolov, Bridewater, NJ (US); Wang Wang, Orefield, PA (US); Xuegong Deng, Piscataway, NJ (US); Wei Zhang, Plainsboro, NJ (US); Greg Blonder, Summit, NJ (US)

(73) Assignee: NanoOpto Corporation, Somerset, NJ (US)

( * ) Notice: Subject to any disclaimer, the term of this patent is extended or adjusted under 35 U.S.C. 154(b) by 0 days.

(21) Appl. No.: 10/633,372

(22) Filed: Aug. 1, 2003

(65) Prior Publication Data

US 2004/0095637 A1    May 20, 2004

Related U.S. Application Data

(60) Provisional application No. 60/399,730, filed on Aug. 1, 2002.

(51) Int. Cl.
*G02B 27/28* (2006.01)
*G02B 5/30* (2006.01)

(52) U.S. Cl. ............ 359/494; 359/483; 359/352; 349/201

(58) Field of Classification Search ........ 349/201, 349/19, 119, 186; 385/16, 10, 11, 24, 37; 359/498, 566, 568, 569, 572, 576, 589, 590, 359/483, 484, 494, 352; 428/1.2
See application file for complete search history.

(56) References Cited

U.S. PATENT DOCUMENTS

| | | | |
|---|---|---|---|
| 4,615,034 A | 9/1986 | Von Gunten et al. | |
| 4,638,669 A | 1/1987 | Chou | |
| 4,650,289 A | 3/1987 | Kuwahara | |
| 4,712,881 A * | 12/1987 | Shurtz et al. | ........ 359/352 |
| 4,732,444 A | 3/1988 | Papuchon et al. | |
| 4,763,972 A | 8/1988 | Papuchon et al. | |
| 4,778,234 A | 10/1988 | Papuchon et al. | |
| 4,998,793 A | 3/1991 | Henry et al. | |
| 5,077,816 A | 12/1991 | Glomb et al. | |
| 5,088,105 A | 2/1992 | Scifres et al. | |
| 5,091,981 A | 2/1992 | Cunningham | |
| 5,283,845 A | 2/1994 | Ip | |
| 5,299,212 A | 3/1994 | Koch et al. | |
| 5,461,246 A | 10/1995 | Chou | |
| 5,467,415 A | 11/1995 | Presby | |
| RE35,337 E | 9/1996 | Patel et al. | |
| 5,617,234 A | 4/1997 | Koga et al. | |

(Continued)

OTHER PUBLICATIONS

Austin, M., et al., "Fabrication for nanocontacts for molecular devices using nanoimprint lithography," J. Vac. Sci. Technol. B 20(2), Mar./Apr. 2002, pp. 665-667.

(Continued)

Primary Examiner—Leonidas Boutsikaris
(74) Attorney, Agent, or Firm—Reed Smith LLP

(57) ABSTRACT

A birefringent device of substantially uniform thickness less than about 10 microns, and being suitable for operating in a wavelength range about a central wavelength is disclosed. The device includes a base substrate, a layer of periodic index regions of alternating refractive indices applied to a first surface of the base substrate, and a cap substrate located substantially adjacent to the layer distal to the base substrate. The layer of periodic index regions has a periodicity of less than the central wavelength. The device being suitable to produce an arbitrary phase retardation between 0 and 2Π phase.

30 Claims, 11 Drawing Sheets

U.S. PATENT DOCUMENTS

| | | |
|---|---|---|
| 5,654,818 A | 8/1997 | Yao |
| 5,691,989 A | 11/1997 | Rakuljic et al. |
| 5,706,301 A | 1/1998 | Lagerstrom |
| 5,719,976 A | 2/1998 | Henry et al. |
| 5,726,805 A | 3/1998 | Kaushik et al. |
| 5,772,905 A | 6/1998 | Chou |
| 5,777,793 A | 7/1998 | Little et al. |
| 5,793,784 A | 8/1998 | Wagshul et al. |
| 5,820,769 A | 10/1998 | Chou |
| 5,848,080 A | 12/1998 | Dahm |
| 5,852,688 A * | 12/1998 | Brinkman et al. ............ 385/16 |
| 5,870,421 A | 2/1999 | Dahm |
| 5,956,216 A | 9/1999 | Chou |
| 5,966,483 A | 10/1999 | Chowdhury |
| 5,973,316 A | 10/1999 | Ebbesen et al. |
| 5,973,784 A | 10/1999 | Szwaykowski et al. |
| 6,035,089 A | 3/2000 | Grann et al. |
| 6,037,644 A | 3/2000 | Daghighian et al. |
| 6,040,936 A | 3/2000 | Kim et al. |
| 6,052,238 A | 4/2000 | Ebbesen et al. |
| 6,064,506 A | 5/2000 | Koops |
| 6,069,380 A | 5/2000 | Chou et al. |
| 6,075,915 A | 6/2000 | Koops et al. |
| 6,101,300 A | 8/2000 | Fan et al. |
| 6,122,103 A | 9/2000 | Perkins et al. |
| 6,122,301 A | 9/2000 | Tei et al. |
| 6,125,220 A | 9/2000 | Copner et al. |
| 6,127,939 A | 10/2000 | Lesesky et al. |
| 6,130,969 A | 10/2000 | Villeneuve et al. |
| 6,154,318 A | 11/2000 | Austin et al. |
| 6,154,479 A | 11/2000 | Yoshikawa et al. |
| 6,169,825 B1 | 1/2001 | Morey et al. |
| 6,175,667 B1 | 1/2001 | Wang et al. |
| 6,191,890 B1 | 2/2001 | Baets et al. |
| 6,198,557 B1 | 3/2001 | Dultz et al. |
| 6,198,860 B1 | 3/2001 | Johnson et al. |
| 6,208,463 B1 | 3/2001 | Hansen et al. |
| 6,215,928 B1 | 4/2001 | Friesem et al. |
| 6,233,375 B1 | 5/2001 | Lang et al. |
| 6,233,380 B1 | 5/2001 | Ferrieu |
| 6,235,141 B1 | 5/2001 | Feldman et al. |
| 6,240,109 B1 | 5/2001 | Shieh |
| 6,251,297 B1 | 6/2001 | Komuro et al. |
| 6,252,709 B1 | 6/2001 | Sato |
| 6,253,009 B1 | 6/2001 | Lestra et al. |
| 6,260,388 B1 | 7/2001 | Borrelli et al. |
| 6,262,002 B1 | 7/2001 | Carey |
| 6,263,002 B1 | 7/2001 | Hsu et al. |
| 6,275,291 B1 | 8/2001 | Abraham et al. |
| 6,285,810 B1 | 9/2001 | Fincato et al. |
| 6,288,840 B1 | 9/2001 | Perkins et al. |
| 6,309,580 B1 | 10/2001 | Chou |
| 6,317,554 B1 | 11/2001 | Kosaka et al. |
| 6,324,192 B1 | 11/2001 | Tayebati |
| 6,339,603 B1 | 1/2002 | Flanders et al. |
| 6,349,103 B1 | 2/2002 | Chung et al. |
| 6,353,623 B1 | 3/2002 | Munks et al. |
| 6,359,915 B1 | 3/2002 | Koch et al. |
| 6,370,177 B1 | 4/2002 | Genei et al. |
| 6,371,662 B1 | 4/2002 | Leard et al. |
| 6,374,016 B1 | 4/2002 | Albert et al. |
| 6,400,860 B1 | 6/2002 | Chandrasekhar et al. |
| 6,410,416 B1 | 6/2002 | Dodabalapur et al. |
| 6,482,742 B1 | 11/2002 | Chou |
| 6,498,679 B1 * | 12/2002 | Lee et al. ................... 359/483 |
| 6,518,189 B1 | 2/2003 | Chou |
| 6,618,104 B1 * | 9/2003 | Date et al. ................... 349/86 |
| 6,661,952 B1 * | 12/2003 | Simpson et al. ............. 385/37 |
| 6,692,797 B1 * | 2/2004 | Owen et al. ................. 428/1.2 |
| 6,713,238 B1 | 3/2004 | Chou et al. |
| 2003/0128349 A1 * | 7/2003 | Unno ........................... 355/67 |
| 2004/0137204 A1 * | 7/2004 | Sutehrland et al. ......... 428/195.1 |

OTHER PUBLICATIONS

Austin, M., et al., "Fabrication of 70nm channel length polymer organic thin-film transistors using nanoimprint lithography," Appl. Phys. Lett. 81 (23), Dec. 2, 2002, pp. 4431-4433.

Bird, G.R. et al., "The Wire Grid as a Near-Infrared Polarizer," J. of the Optical Soc. of America, 50 (9), 886-890, (1960).

Born, Max, and Wolf, Emil: Principles of Optics: Electromagnetic Theory of Propagation, Interference and Diffraction of Light 7th ed. Oct. 1, 1999. Cambridge University Press. p. 790.

Brundrett, D. L.., et al., "Normal-incidence guided-mode resonant grating filters: design and experimental demonstration" Optics Lett., May 1, 1998;23(9):700-702.

Cao, H., et al., "Fabrication of 10 nm enclosed nanofluidic channels," Appl. Phys. Lett. 81 (1), Jul 1, 2002, pp. 174-176.

Cao, H., et al., "Gradient Nanostructures for interfacing microfluidics and nanofluidics," Appl. Phys. Lett. 81(16), Oct. 14, 2002, pp. 3058-3060.

Chang, Allan S. P., et al. "A new two-dimensional subwavelength resonant grating filter fabricated by nanoimprint lithography" Department of Electrical Engineering, NanoStructures Laboratory, Princeton University.

Chigrin, D. N.,et al., "Observation of total omnidirectional reflection from a one-dimensional dielectric lattice" Appl. Phy. A. 1999;68:25-28.

Chou, S. Y., et al., "Subwavelength transmission gratings and their applications in VCSELs" Proc. SPIE. 1997;3290:73-81.

Chou, S. Y., et al., "Observation of Electron Velocity Overshoot in Sub-100-nm-channel MOSFET's in Silicon," IEEE Electron Device Letters, vol. EDL-6, No. 12, Dec. 1985, pp. 665-667.

Chou, S.Y., et al., "Imprint Lithography with 25-Nanometer Resolution" Apr. 5, 1996;272(5258):85-87.

Chou, S.Y. , et al., "Sub-10 nm imprint lithography and applications" J. Vac. Sci. Technol. B. Nov./Dec. 1997;15(6):2897-2904.

Chou, S., et al., "Imprint of sub-25 nm vias and trenches in polymers," Appl. Phys., Lett. 67 (21), Nov. 20, 1995, pp. 3114-3116.

Chou, S., et al., "Lateral Resonant Tunneling Transistors Employing Field-Induced Quantum Wells and Barriers," Proceedings of the IEEE, vol. 79, No. 8, Aug. 1991, pp. 1131-1139.

Chou, S., et al., "Nanoscale Tera-Hertz Metal-Semiconductor-Metal Photodetectors," IEEE Journal of Quantum Electronics, vol. 28, No. 10, Oct. 1992, pp. 2358-2368.

Chou, S., et al., "Ultrafast and direct imprint of nanostructures in silicon," Nature, vol. 417, Jun. 20, 2002, pp. 835-837.

Chou, S., G.A., "Patterned Magnetic Nanostructures and Quantized Magnetic Disks," Proceedings of the IEEE, vol. 85, No. 4, Apr. 1997, pp. 652-671.

Cui, B.,et al., "Perpendicular quantized magnetic disks with 45 Gbits on a 4 x 2 $cm^2$ area," Journal of Applied Physics, vol. 85, No. 8, Apr. 15, 1999, pp. 5534-5536.

Deshparde, P., et al., "Lithographically induced self-assembly of microstructures with a liquid-filled gap between the mask and polymer surface," J. Vac. Sci. Technol. B 19(6), Nov./Dec. 2001, pp. 2741-2744.

Deshpande, P., et al., "Observation of dynamic behavior lithographically induced self-assembly of supromolecular periodic pillar arrays in a homopolymer film," Appl. Phys. Lett. 79(11), Sep. 10, 2001, pp. 1688-1690.

Fan, S., et al., "Design of three-dimensional photonic crystals at submicron lengthscales" Appl. Phys. Lett. Sep. 12, 1994;65(11)1466-1468.

Feiertag, G., et al., "Fabrication of photonic crystals by deep x-ray lithography" Appl. Phys. Lett., Sep. 15, 1997;71(11):1441-1443.

Fink, Y., et al, "Guiding optical light in air using an all-dielectric structure" J. Lightwave Techn. Nov. 1999;17(11):2039-2041.

Fink, Y., et al, "A dielectric omnidirectional reflector" Science. Nov. 27, 1998;282:1679-1682.

Fischer, P.B., et al., "10 nm electron beam lithography and sub-50 nm overlay using a modified scanning electron microscope," Appl. Phys. Lett. 62 (23), Jun. 7, 1993, pp. 2989-2991.

Flanders, D.C., "Submicrometer periodicity gratings as artificial anisotropic dielectrics," Appl. Phys. Lett. 42 (6), 492-494 (1983).

Gabathuler, W., et al., "Electro-nanomechanically wavelength-tunable integrated-optical bragg reflectors Part II: Stable device operation" Optics Communications. Jan. 1, 1998;145:258-264.

Gaylord, Thomas K., et al., "Analysis and applications of optical diffraction by gratings," Proc. IEEE. May 1985;73(5):894-937.

Goeman, S., et al., "First demonstration of highly reflective and highly polarization selective diffraction gratings (GIRO-Gratings) for long-wavelength VCSEL's" IEEE Photon. Technol. Lett. Sep. 1999;10(9):1205-1207.

Hayakawa, Tomokazu, et al, "ARROW-B Type Polarization Splitter with Asymmetric Y-Branch Fabricated by a Self-Alignment Process," J. Lightwave Techn, 15(7), 1165-1170,(1997).

Hereth, R., et al, "Broad-band optical directional couplers and polarization splitter," J. Lightwave Techn., 7(6), 925-930, (1989).

Ho, K.M., et al., "Existance of a photonic gap in periodic dielectric structures" Dec. 17, 1990;65(25):3152-3155.

Ibanescu, M., et al., "An all-dielectric coaxial waveguide" Science. Jul. 21, 2000;289:415-419.

Joannopoulos, J.D., et al., "Photonic crystals: putting a new twist on light" Nature. Mar. 13, 1997(6621):143-149.

Kokubun, Y., et al, "ARROW-Type Polarizer Utilizing Form Birefringence in Multilayer First Cladding," IEEE Photon. Techn. Lett., 11(9), 1418-1420, (1993).

Kuksenkov, D. V., et al., "Polarization related properties of vertical-cavity surface-emitting lasers" IEEE J. of Selected Topics in Quantum Electronics. Apr. 1997;3(2):390-395.

Levi, B.G., "Visible progress made in three-dimensional photonic 'crystals'" Physics Today. Jan. 1999;52(1):17-19.

Li, M., et al., "Direct three-dimensional patterning using a nanoimprint lithography," Appl. Phys. Lett. 78 (21), May 21, 2001, pp. 3322-3324.

Li, M., et al., "Fabrication of circular optical structures with a 20 nm minimum feature using nanoimprint lithography," Appl. Phys. Lett. 76 (6), Feb. 7, 2000, pp. 673-675.

Magel, G.A., "Integrated optic devices using micromachined metal membranes" SPIE. Jan. 1996;2686:54-63.

Magnusson, R., et al., "New principle for optical filters" Appl. Phys. Lett. Aug. 31, 1992;61(9):1022-1023.

Mashev, L., et al., "Zero order anomaly of dielectric coated gratings" Optics Communications. Oct. 15, 1985; 55(6):377-380.

Moharam, M. G., et al., "Rigorous coupled-wave analysis of planar-grating diffraction" J. Opt. Soc. Am. Jul. 1981;71(7):811-818.

Mukaihara, T., et al., "Engineered polarization control of GaAs/AlGaAs surface emitting lasers by anisotropic stress from elliptical etched substrate hole" IEEE Photon. Technol. Lett. Feb. 1993;5(2):133-135.

Noda, S., et al., "New realization method for three-dimensional photonic crystal in optical wavelength region" Jpn. J. Appl. Phys. Jul. 15, 1996;35:L909-L912.

Oh, M., et al., "Polymeric waveguide polarization splitter with a buried birefringent polymer" IEEE Photon. Techn. Lett. Sep. 11, 1999;(9):1144-1146.

Painter, O., et al., "Lithographic tuning of a two-dimensional photonic crystal laser array" IEEE Photon. Techn. Lett., Sep. 2000;12(9):1126-1128.

Painter, O., et al., "Room temperature photonic crystal defect lasers at near-infrared wavelengths in InGaAsP" J. Lightwave Techn., Nov. 1999;17(11):2082-2088.

Peng, S., et al., "Experimental demonstration of resonant anomalies in diffraction from two-dimensional gratings" Optics Lett. Apr. 15, 1996;21(8):549-551.

Ripin, D. J., et al., "One-dimensional photonic bandgap microcavities for strong optical confinement in GaAs and GaAs/Al$_x$O$_y$ semiconductor waveguides" J. Lightwave Techn. Nov. 17, 1999;(11):2152-2160.

Rokinson, L.P., et al., "Double-dot charge transport in Si single-electron/hole transistors," Appl. Phys. Lett. 76 (12), Mar. 20, 2000, pp. 1591-1593.

Rokhinson, L.P., et al., "Kondo-like zero-bias anomaly in electronic transport through an ultrasmall Si quantum dot," Physical Review B, vol. 60, No. 24, Dec. 15, 1999, pp. 319-321.

Rokhinson, L.P., et al., "Magnetically Induced Reconstruction of the Ground State in a Few-Electron Si Quantum Dot," Physical Review Letters, vol. 87, No. 16, Oct. 15, 2001, pp. 1-3.

Rudin, A., et al., "Charge-ring model for the charge-induced confinement enhancement in stacked quantum-dot transistors," Appl. Phys. Lett. 73 (23), Dec. 7, 1998, pp. 3429-3431.

Russell, P. St. J., et al., "Full photonic bandgaps and spontaneous emission control in 1D multilayer dielectric structures" Opt. Commun. Feb. 1, 1999;160:66-71.

Rytov, S. M., "Electromagnetic properties of a finely stratified medium" Soviet Physics JETP (Journal of Experimental & Theoretical Physics). May 1956;2(1):466-475.

Schablitsky, S., et al., "Controlling polarization of vertical-cavity surface-emitting lasers using amorphous silicon subwavelength transmission gratings," Appl. Phys. Lett. 69 (1), Jul. 1, 1996, pp. 7-9.

Sharon, A., et al., "Narrow spectral bandwidths with grating waveguide structures" Appl.Phys.Lett. Dec. 30, 1996;69(27):4154-4156.

Sugimoto, Y., et al., "Experimental verification of guided modes in 60 degrees—bent defect waveguides in AlGaAs-based air-bridge-type two-dimensional photonic crystal slabs" J. Appl. Phys. Mar. 1, 2002;91(5):3477-3479.

Sun, X., et al., "Multilayer resist methods for nanoimprint lithography on nonflat surfaces" J. Vac. Sci. Technol. B. Nov./Dec. 1998;16(6)3922-3925.

Tibuleac, S., et al., "Reflection and transmission guided-mode resonance filters" J. Opt. Soc. Am. A. Jul. 1997;14(7):1617-1626.

Trutschel, U., et al, "Polarization splitter based on anti-resonant reflecting optical waveguides," J Lightwave Techn., 13(2), 239-243, (1995).

Tyan, R.C., et al., "Design, fabrication and characterization of form-birefringent multilayer polarizing beam splitter" J. Opt. Soc. Am. A. Jul. 1997;14(7):1627-1636.

Tyan, R. et al., "Polarizing beam splitters constructed of form-birefringent multilayer gratings," SPIE 2689, 82-89.

van Blaaderenm, Alfons, "Opals in a New Light" Science. Oct. 30, 1998;282(5390):887-888.

van Doom, A. K. Jansen, et al., "Strain-induced birefringence in vertical-cavity semiconductor lasers" IEEE J. Quantum Electronics. Apr. 1998;34(4):700-706.

Vellekoop, A.R. et al, "A small-size polarization splitter based on a planar phase optical phased array," J Lightwave Techn., 8(1), 118-124, (1990).

Wang, J., et al., "Molecular alignment in submicron patterned polymer matrix using nano-imprint lithography," Appl. Phys. Lett. 77 (2), Jul. 10, 2000, pp. 166-168.

Wang, J., et al., "Fabrication of a new broadband waveguide polarizer with a double-layer 190 nm period metal-gratings using nanoimprint lithography" J. Vac. Sci. Technol. B. Nov./Dec. 1999;17(6):2957-2960.

Wang, S. S., et al., "Design of waveguide-grating filters with symmetrical line shapes and low sidebands" Opt. Lett. Jun. 15, 1994;19(12):919-921.

Wang, S. S., et al., "Guided-mode resonances in planar dielectric-layer diffraction gratings" J. Opt. Soc. Am. A. Aug. 1990;7(8):1470-1475.

Weber, M. F., Stover, C.A., Gilbert, L.R., Nevitt, T.J., Ouderkirk, A.J. "Giant birefringent optics in multilayer polymer mirrors," Science, 287, 2451-2456, Mar. 31, 2000.

Winn, J. N., et al., "Omnidirectional reflection from a one-dimensional photonic crystal" Opt. Lett. Oct. 15, 1998;23(20):1573-1575.

Wu, L., et al., "Dynamic modeling and scaling of nanostructure formation in the lithographically induced self-assembly and self-construction" Appl. Phys. Lett. May 12, 2003;82(19):3200-3202.

Yablonovitch, E., "Inhibited spontaneous emission in solid-state physics and electronics" Phys. Rev. Lett. May 18, 1987;58(20):2059-2062.

Yablonovitch, E., et al., "Photonic band structure: The face-centered-cubic case employing nonspherical atoms" Phys. Rev. Lett. Oct. 21, 1991;67(17):2295-2298.

Yanagawa, H., et al, "High extinction guided-wave optical polarization splitter," IEEE Photon. Techn. Lett., 3(1), 17-18, (1991).

Yoshikawa, T., et al., "Polarization-controlled single-mode VCSEL" IEEE J. Quantum Electronics. Jun. 1998;34(6):1009-1015.

Yu, Z., et al., "Reflective polarizer based on a stacked double-layer subwavelength metal grating structure fabricated using nanoimprint lithography," Appl. Phys. Lett. 77 (7), Aug. 14, 2000, pp. 927-929.

Zakhidov, A.A., et al., "Carbon structures with three-dimensional periodicity at optical wavelengths" Science. Oct. 30, 1998;282(5390):897-901.

* cited by examiner

FIG. 1A
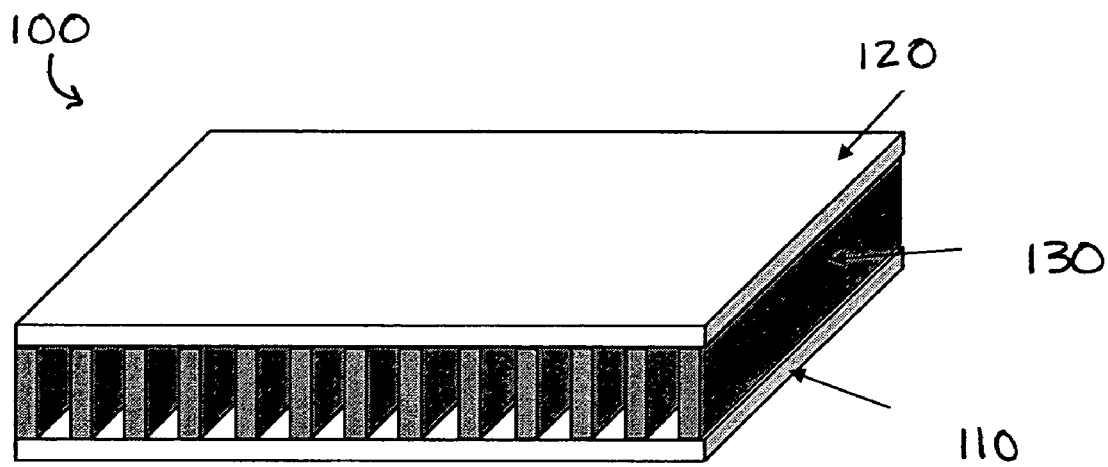
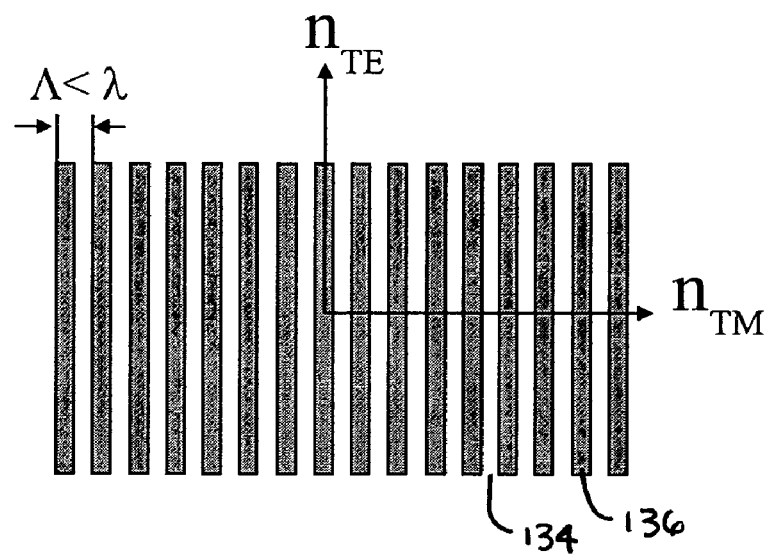
FIG. 1B

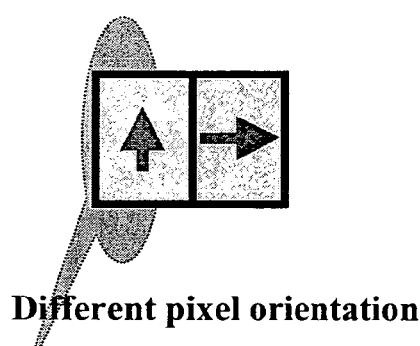
Different pixel orientation
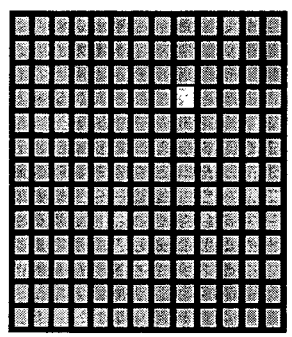
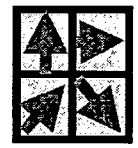
FIG. 10B
Four different pixel orientations
FIG. 10A
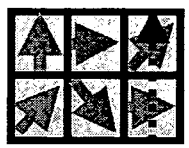
FIG. 10C
General case – multiple "arbitrary" orientations of pixel configurations

PRECISION PHASE RETARDATION DEVICES AND METHOD OF MAKING SAME

This application claims priority from Provisional Patent Application Ser. No. 60/399,730, filed Aug. 1, 2002, which is hereby incorporated by reference as if fully set forth in its entirety herein.

FIELD OF THE INVENTION

The present invention relates generally to optical components being suitable for polarizing electromagnetic radiation.

BACKGROUND OF THE INVENTION

Propagating plane wave electromagnetic radiation is composed of two orthogonally polarized components—designated as the transverse electric and transverse magnetic fields. In many applications, it may be necessary or desirable to separately control the amplitudes and relative phase of the transverse electric (TE) and the transverse magnetic (TM) polarizations. For example, device performance that varies based on polarization state may provide for multi-functioning opto-electronic devices.

Birefringence is a property of a material to divide electromagnetic radiation into its two components, and may be found in materials which have two different indices of refraction, referred to as $n\perp$ and $n\|$ (or $n_p$ and $n_s$), in different directions, often orthogonal. That is, light entering certain transparent materials, such as calcite, splits into two beams which travel at different speeds. Birefringence is also known as double refraction. Birefringence may serve to separate the two orthogonal polarizations, thereby allowing such devices to manipulate each polarization independently. For example, polarization may be used to provide add/drop capabilities, beamsplit incoming radiation or filter, by way of non-limiting example only. Birefringence may be caused by the anisotropic electrical properties of molecules, which form crystals. Alternatively, by forming patterns of three dimensional structures.

Anisotropic materials exhibit birefringence naturally in certain crystals such as hexagonal (such as calcite), tetragonal, and trigonal crystal classes generally characterized by having a unique axis of symmetry, called the optic axis, which imposes constraints upon the propagation of light beams within the crystal. Traditionally three materials are used for the production of polarizing components—calcite, crystal quartz and magnesium fluoride.

Generally, calcite is a widely preferred choice of material in birefringent applications, because of its high birefringence and wide spectral transmission, relative to other naturally occurring materials, though it is a fairly soft crystal and is easily scratched. Calcite, generally, has a birefringence approximately 0.172.

Quartz, another often useful birefringent material, is available as either natural crystals or as synthetic boules. Natural and synthetic quartz both exhibit low wavelength cutoffs—natural quartz transmits from 220 nm, while synthetic transmits from 190 nm—and both transmit out to the infrared. Quartz is very hard and strong thereby lending to the fabrication of very thin low order retardation plates. Unlike calcite or magnesium fluoride, quartz exhibits optical activity, and there is no unique direction (optic axis) down which ordinary and extraordinary beams propagate under one refractive index with the same velocity. Instead, the optic axis is the direction for which the two indices are closest: a beam propagates down it as two circularly polarized beams of opposite hand. This produces progressive optical rotation of an incident plane polarized beam, which effect may be put to use in rotators. Quartz has a birefringence on the order of 0.009.

Single crystal magnesium fluoride is another useful material for the production of polarizers, because of its wide spectral transmission. Single crystal magnesium fluoride has a birefringence of approximately 0.18.

Waveplates, also referred to as retarders, delay one of two orthogonally polarized components of light incident upon them. Waveplates are used in optical assemblies to alter the phase of light. Waveplates are generally asymmetric, and have a different refractive index in one axis than the other. Light polarized along the fast or optical axis encounters a smaller refractive index than light polarized perpendicular to this axis. The two orthogonal components of light, one polarized along the optical axis and one polarized perpendicular to that axis, traverse the wave plate and continuously acquire phase difference within the bulk of the material. For waveplates of ½ or ¼ wave delay, the two orthogonal components will emerge with a phase difference of $\pi$ or $\pi/2$. In the case of a half waveplate, incident polarized light at an angle $\ominus$ to the optical axis is rotated by an angle $2\ominus$. A quarter waveplate causes linearly polarized light to become circularly polarized for incident polarization oriented at 45° with respect to the optical axis. Waveplates are characterized by bandwidth, defined as the range of wavelengths over which a device will operate, and order. Zero order waveplates generally have the largest bandwidth and as a result are preferred in applications that require wavelength tuning, or multiplexing, combining of light with substantially different wavelengths.

SUMMARY OF THE INVENTION

A birefringent device of substantially uniform thickness less than about 10 microns, and being suitable for operating in a wavelength range about a central wavelength is disclosed. The device includes a base substrate; a layer of periodic index regions of alternating refractive indices applied to a first surface of the base substrate, the layer having a periodicity of less than the central wavelength; and, a cap substrate located substantially adjacent to the layer distal to the base substrate, wherein the device is suitable to produce an arbitrary phase retardation between 0 and $2\Pi$ phase.

BRIEF DESCRIPTION OF THE FIGURES

Understanding of the present invention may be facilitated by consideration of the following detailed description of the preferred embodiments of the present invention taken in conjunction with the accompanying drawings, in which like numerals refer to like parts and in which:

FIG. 1A illustrates a birefringent device according to an aspect of the present invention;

FIG. 1B illustrates a top view of a periodic region of the birefringent device of FIG. 1A according to an aspect of the present invention;

DETAILED DESCRIPTION OF THE PREFERRED EMBODIMENTS

Figure 2:
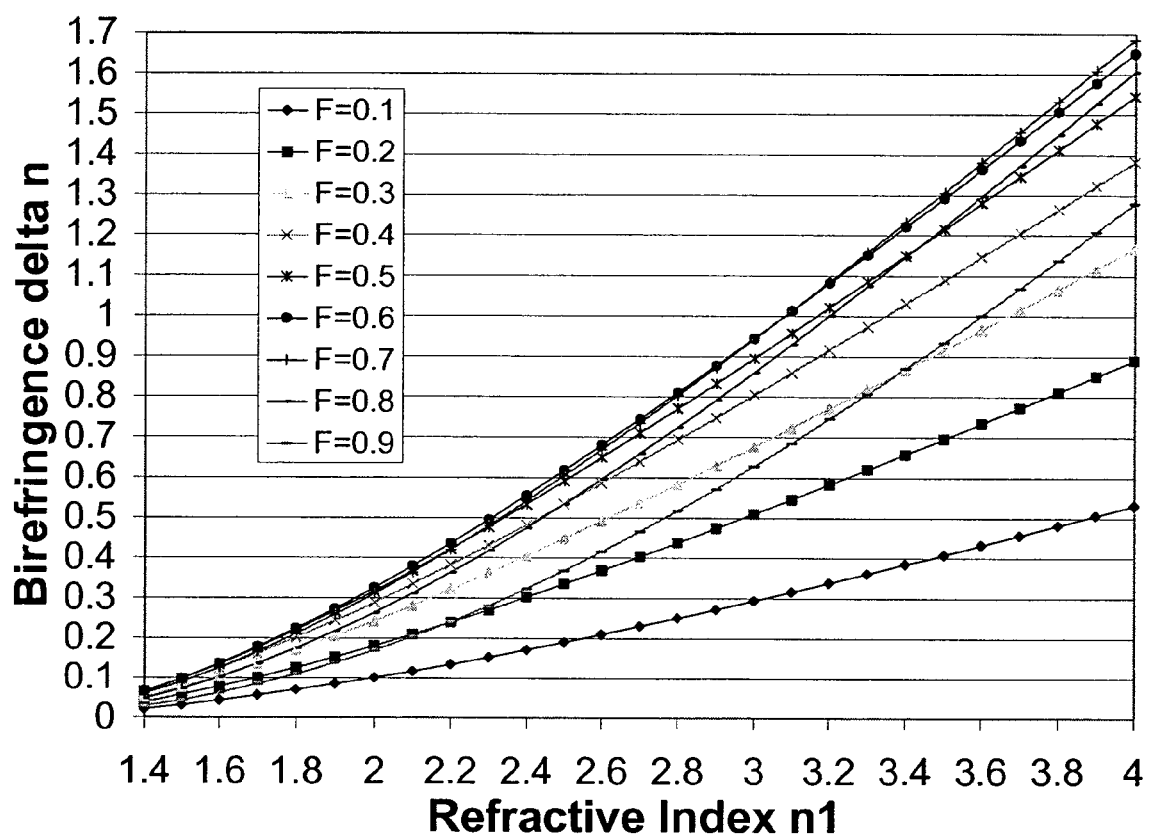
FIG. 2 illustrates the relationship between birefringence and refractive index for different filing ratios of the device of FIG. 1A according to an aspect of the present invention.

It is to be understood that the figures and descriptions of the present invention have been simplified to illustrate elements that are relevant for a clear understanding of the present invention, while eliminating, for the purpose of clarity, many other elements found in typical photonic components and methods of manufacturing the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

According to an aspect of the invention, purely isotropic materials arranged in three-dimensional structures may be used to produce form birefringence in structures larger than molecules, if the structures are smaller than the wavelength of interest. Form birefringent structures may offer the ability to tailor the magnitude of the birefringence, by precise control of the geometry and material of the three-dimensional features. It also may allow for the engineering of layers with much higher birefringence than naturally birefringent materials. This may allow optical components built on the basis of from birefringent structures to achieve target, retardation, phase compensation or wavefront manipulation in physically smaller material volumes than may otherwise be possible. Form birefringent structures as presented herein may allow the birefringence to be engineered with a gradient along a certain direction of propagation, thereby providing birefringence with a changing magnitude along that direction. Such graduated birefringence does not exist in nature and may be used to engineer novel optical phase manipulation designs. The proposed method for precision phase manipulation structures also may allow optical materials to be deposited with birefringent layers that are fragmented, or pixilated with areas of different birefringence deposited on one plane. These areas may vary by birefringence magnitude or principle optical axis orientation.

Advantages of the present invention may include that no accurate polishing is required to fabricate precision waveplates of any target retardation or order. For natural birefringent waveplates, accurate polishing is required to obtain the appropriate material thickness. For form birefringence, phase control is achieved by accurately controlling the structure size. This control may be achieved by utilizing semiconductor fabrication techniques that achieve within a few nanometers of accuracy, corresponding to waveplate retardation tolerances of hundredths of a wavelength.

According to an aspect of the present invention, a superior way of producing zero order waveplates all the way from the UV to the far infrared spectrum may be provided. Basically, for all of the wavelengths, one design principle may be applied by choosing the period (0 order diffraction), choosing the material, optimizing the duty cycle, fill ratio, and optimizing the grating depth.

According to an aspect of the present invention, a fabrication method for zero-order and multiple order waveplates is presented in which: an arbitrary substrate may be used, including optically active materials such as garnet (optical rotator); the waveplate may be applied to one or both sides of a substrate; the waveplate may be applied on the top or underneath of a dielectric or metallic mirror. Further, by proper choice of the dialectic materials for waveplate fabrication, its thickness may be kept to a few microns for an arbitrary retardation between 0 and $\pi$ phase. Further, because of this small thickness, the waveplate may be a building block in integrated optical subassemblies of wafer fabricated optical components. Examples of such assemblies include, but are not limited to, combinations of stacked waveplates and polarizes, waveplates and a polarization beam splitter, waveplate and polarization beam combiner, waveplate and a filter. Further, because of its small thickness, the waveplate can be deposited on bulk optical components, such as lenses, or crystals. And, it can be used for phase or aberration compensation.

Also, the waveplate may include a birefringent region fabricated by periodically alternating high/low index of refraction three dimensional features, and forming underlying optical layers and over coating optical layers. Also, the birefringent region may be made of alternating dielectric and air strips or may be a filled structure of two alternating materials with different indices of refraction. Higher contrast between the indices of refraction of the materials may give higher birefringence.

The birefringent region may be built of a grating of a material of a fixed index of refraction, and a material with a tunable index of refraction. Such a material may be, but is not limited to, liquid crystals disposed and aligned within the grating structure of the first material. Applying a voltage across the liquid crystals may change the index of refraction of the liquid crystals and correspondingly change the birefringence of the waveplate. Such a configuration may constitute a tunable waveplate.

The birefringent region may be built on top of optical layers used for surface planarization and index matching of a whole optical assembly. An overcoat may be deposited on top of the birefringent region to seal from environmental exposure, for anti-scratch protection and index matching of the birefringent region to the physical layers on top of the waveplate.

Further, waveplates made of multi-layer birefringent structures, such as vertically stacked waveplates, may be built by building layer after layer of birefringent regions on top of overcoated waveplates. Intermediate layers may be disposed between the birefringent regions for planarization, protection and index matching. Waveplates made of multi-layer birefringent structures may be built by overlaying either parallel grating birefringent structures or crossed grating birefringent structures. The crossed or parallel gratings can be of different period, which may be used to optimize the birefringence and improve the overall mechanical structural stability of the stacked multi-layer birefringent assembly.

Waveplates built according to the present invention may have higher birefringence than naturally optical birefringent materials if the indices of refraction of the building materials are sufficiently different and the grating period is smaller than the wavelength of light.

Further, extremely high retardation accuracy, compared to conventionally polished birefringent materials may be realized by the fabrication process utilizes material layers for etch stopping. Such layers stop or sufficiently decrease the grating etch process, therefore giving control over the exact grating depth. By precisely controlling the grating depth the phase retardation, accuracy of the waveplate can be controlled. Materials suitable for etch stops may be optically transparent and have etch rates several times lower than the materials constituting the birefringent region. The etch stop materials may be included in the overall optical index matching design.

For designs that require high retardation and high retardation accuracy, a stacked waveplate approach may be used, where two materials with large index of refraction difference are used to create most of the retardation and then another birefringent region is developed on top, from materials with smaller index of refraction difference, to accurately complete the total retardation. Such waveplates can have very different indices of refraction for TE and TM polarizations. An approach to achieve simultaneous optical index matching for both TE and TM polarizations may use a three part waveplate design-underlying layers, birefringent region and overcoat layers, in combination with an anti reflection design.

The layers under the grating may be used to modify the back-reflected amplitudes, through the grating, for the TE and TM polarizations. For waveplate designs with a small difference between the index of refraction for the TE and TM polarizations, the layers under the grating may provide sufficient reflection amplitudes that cancel most back reflections from the waveplate for both polarizations.

The grating region may be used in the overall waveplate ARC design by taking into consideration the different phases that the TE and TM reflections (from the bottom of the grating) acquire. For a fixed retardation, the phases for the TE and TM polarizations may be fixed but different. These phases may be used to calculate the TE and TM reflection fields from the grating bottom after they have propagated back through the grating region.

The layers on top of the grating (overcoat) may be used to adjust the reflected TE and TM amplitudes from the top of the grating region. For waveplate designs with a small difference between the index of refraction for the TE and TM polarizations, the layers on top of the grating may provide sufficient reflection amplitudes that cancel most back reflections from the waveplate for both polarizations.

To achieve maximum back reflection cancellation (maximum transmission through the waveplate) for TE and TM polarizations of a general form birefringence waveplate, all three regions, under the grating layers, grating layer and over the grating layers, may be used and optimized. Such waveplates may be built on a wafer in two dimensional arrays or pixel arrays. Such an array may be made of periodically alternating areas with different retardation (different waveplates) or different orientations of the principle axis. The size of the areas depends on the laser beam size and the application. Adjacent areas may have the same or different sizes. Adjacent areas may have either a different grating period or different grating depth or be fabricated of different materials. Such an array may be made of alternating waveplates and other wafer fabricated optical components such as, but not limited to beam splitters, polarizers, mirrors or just transparent areas with no optical function (beam is transmitted with no alteration of the amplitude or phase). Further, the ability to create three dimensional index gradient structures with stacking and chirping may be provided.

Referring now to FIG. 1A, there is shown a birefringent device 100 according to an aspect of the present invention. Birefringent device 100 may include a base 110, a cap 120, and a subwavelength structure 130 substantially sandwiched therebetween.

Subwavelength structure 130 may include multiple subwavelength elements each of width $F_G$ and height $t_{130}$. Further, the dimensions of the elements may be common or vary or be chirped as will be understood by those possessing an ordinary skill in the pertinent arts. Subwavelength structure 130 may have a period $X_G$ of subwavelength elements. Subwavelength structure 130 may have a period several times smaller than the wavelength of radiation to be used with device 100. This period size may provide zero or substantially small diffraction into higher orders and, therefore, subwavelength structure 130 may be used in zero order. Alternatively, other sized periods may be used, resulting in possible decreased efficiency as a result of coupling a fraction of the light into orders other than the desired zero order. These other sized periods may also be varied or chirped. As may be seen in FIG. 1B, alternating refractive indices may be used. For example, a higher index material 136, having a refractive index $n_F$, may be positioned substantially adjacent to a lower index material 134, having a refractive index no, creating alternating regions of relatively high and low indices, respectfully. Higher index material 136 may be substantially silicon nitride or silicon such that refractive index $n_F$ is approximately equal to 1.9 and 3.6 at 1550 nm, for example. Lower index material may be air such that refractive index no is approximately equal to one. By way of non-limiting example only, higher index material 136 may have a refractive index multiple times larger than the refractive index of lower index material 134, such as two or three times, for example. The lower index material may also be substantially air such that refractive index no is approximately equal to 1. The filling ratio of subwavelength structure 130, denoted $F_G/X_G$, may be defined as the ratio of the width of the index area of the higher of the two refractive index elements within the period to the overall period.

Subwavelength structure 130 may be grown or deposited on base 110 or cap 120. For the sake of discussion only, base 110 will be used even though cap 120 may be alternatively used as a substrate for structure 130 formation. Subwavelength structure 130 may be formed into or onto base 110 using any suitable replicating process, such as a lithographic process. For example, nanoimprint lithography consistent with that disclosed in U.S. Pat. No. 5,772,905, entitled NANOIMPRINT LITHOGRAPHY, the entire disclosure of which is hereby incorporated by reference as if being set forth in its entirety herein, may be effectively used. Therein is taught a lithographic method for creating subwavelength elements. For purposes of completeness and in summary only, a mold having at least one protruding feature may be pressed into a thermo-plastic applied to base 110. The at least one protruding feature in the mold creates at least one corresponding recess in the thin film. After replicating, the mold is removed from the film, and the thin film processed such that the thin film in the at least one recess is removed, thereby exposing a mask that may be used to etch a pattern or set of devices into base 110. Thus, the patterns in the mold are replicated in the thin film, and then the patterns replicated into the thin film are transferred into base 110 using reactive ion etching (RIE) or plasma etching, for example. Of course, any suitable method for forming a suitable structure into or onto an operable surface of base 110, or cap 120 for that matter, may be utilized though, such as photolithography, holographic lithography, or e-beam lithography, by way of non-limiting example only. Base 110 may take the form of silicon dioxide having a thin film of silicon thereon.

Subwavelength structure 130 may include a region of tunable refractive indices such as by use of liquid crystals for example. As is known to those having an ordinary skill in the pertinent arts, liquid crystals may be defined as molecules that have different degrees of order and therefore exist in all three common states of matter, solid, liquid and gas. In the solid state there may exist a rigid arrangement of molecules which stay in a fixed position and orientation with a small amount of variation from molecular vibration. To maintain this arrangement there are large forces holding the molecules in place and therefore a solid is difficult to deform. In the liquid phase the molecules may have no fixed position or orientation and are free to move in a random fashion and the liquid state has less order than the solid state. The random motions of the molecules mean that the intermolecular attractive forces that kept a solid together are now only strong enough to keep the liquid molecules fairly close together. A liquid may be easily deformed. In the gas state the random motion of the molecules may have increased to overcome the intermolecular forces and the molecules eventually spread out to fill any container that holds them. The order in a liquid which derived from the closeness of the molecules has therefore been lost in a gas which consequently has less order than the liquid. The probability of molecules in a certain region being in a rigid arrangement and of the same orientation may be used to define a positional and orientational order which is greatest in the solid state and least in the gaseous state. The differences between the three states may be attributed to the temperature of the substance. Temperature is a measure of the randomness of the molecules and therefore the higher the temperature the less order exists and increasing temperature will cause the transition from a solid to a liquid and then to a gas. The temperature of the substance may be controlled by applying a voltage. A thermotropic liquid crystalline phase occurs in some substances in a temperature region between the solid and liquid states. In this state the substance possesses some properties of both liquids and solids. A liquid crystal is a fluid like a liquid but is anisotropic in its optical and electromagnetic characteristics like a solid. When the liquid crystal is formed from the isotropic state some amount of positional or orientational order is gained. It is this order that accounts for the anisotropies of the substance. Liquid crystals may be suitable to change refractive indices by applying voltage.

Liquid crystals may be combined with the subwavelength structure. For example, the subwavelength structure may be etched without a cap. After this etching the liquid crystals may be disposed substantially adjacent to subwavelength structure. Liquid crystal molecules may be approximately a few nanometers in size. This size along with other properties may aid in the alignment in the groves of subwavelength structure. The liquid crystal molecules may be elongated and may orient with the longer dimension along the subwavelength stricture grooves, for example. This orientation may make the liquid crystal layer birefringent with respect to the TE and TM fields.

If a voltage is applied across the subwavelength structure gap, the field may be perpendicular to the molecules orientation, these molecules may experience torque and start rotating, thereby orienting themselves parallel to the field. When the liquid crystals exhibit rotational symmetry with respect to at propagating field normal to the liquid crystal/subwavelength structure plane, the liquid crystal may have substantially the same index for both TE and TM.

As will be recognized by those possessing ordinary skill in the pertinent arts, various patterns may be nanoimprinted in such a manner onto or into base 110. Such patterns may take the form of strips, trenches, pillars, circles, or holes, for example, all of which may have a common period or not, and may be of various heights and widths. Strips may take the form of rectangular grooves, for example, or alternatively triangular or semicircular grooves, by way of non-limiting example. Similarly pillars, basically the inverse of holes, may be patterned. Such pillars may be patterned with a common period in either axis or alternatively by varying the period in one or both axes. The pillars may be shaped in the form of, for example, elevated steps, rounded semicircles, or triangles. The pillars may also be shaped with one conic in one axis and another conic in another, for example.

An etch stop layer may be utilized during the formation of subwavelength structure 130. Etch stop layer may be deposited under a dielectric material prior to etching. As is known to those possessing an ordinary skill in the pertinent arts, an etch stop may often be used to more accurately etch by adding a layer of material which etches at a slower rate. This etch layer, because of the slower etch rate, provides a buffer during the etching process thereby creating features with the appropriate size without excruciating etch time sensitivity. By controlling the feature depth, the phase retardation accuracy of the waveplate may be controlled. A suitable etch stop employed in the formation of subwavelength structure 130 may be optically transparent and have etch times approximately several times lower than the other etched materials, such as aluminum oxide or hafnium dioxide applied approximately 10–100 nm thick. Etch stop layer may also exhibit favorable optical properties, such as by being a transparent dielectric, for example, and may be applied in a thickness greater than required for etching stopping in order for a portion of etch stop layer to become integrated in the optical design.

The etch stop may be instrumental in achieving desired retardation. The process may include the following: depositing a etch stop layer; depositing a grating layer; developing a hard mask on the top of the dielectric layer; etching the grating, wherein the etching stops or slows at the etch stop layer, thereby providing a target thickness defined by the initial thickness of the deposited dielectric. This hard mark may define a grating period and fill ratio, for example.

Additionally, according to an aspect of the present invention the etch stop layer may be designed as the base 110. The etch stop layer may be used to vary the amplitude of the reflections from the bottom of the grating. The field reflected from the bottom will propagate back through the subwavelength structure and may interfere with the reflections from the cap. The phase that this field picks up in the subwavelength structure and the amplitude may lead to cancellation of the total back reflection, thereby resulting in improved transmission through the subwavelength structure. This may result in higher achieved accuracy.

Base 110 may be formed substantially of a dielectric material or a metallic mirror. A dielectric material, as is known to those possessing an ordinary skill in the pertinent arts, may be a substance that is a poor conductor of electricity, but an efficient supporter of electrostatic fields, often including ceramics, mica, glass, plastics, and the oxides of various metals, such as $Al_2O_3$. Importantly, a dielectric may support an electrostatic field while dissipating minimal energy in the form of heat.

Base 110 may be substantially formed from one of many dielectrics or combinations therewith, or may be a metallic mirror. Specifically, base 110 may take the form of silicon dioxide, hafnium dioxide, aluminum, or gold, for example. Base 110 may be formed in the range of 1 nm–1 um thick, such as 100 nm, for example.

Base 110 may be substantially index matched with higher index material 136, for example. Alternatively, base 110 may be substantially index matched to lower index material 134. Base 110 may have a refractive index different from both high index material 136 and lower index material 134. Base 110 may have a refractive index substantially between higher index material 136 and lower index material 134.

Cap 120 may be formed substantially of a dielectric material or metallic mirror. Cap 120 may be formed from different materials than base 110 or may be formed from the same materials. Cap 120 may be substantially formed from one of many dielectrics or combinations thereof. Specifically, cap 120 may take the form of silicon dioxide, aluminum dioxide, hafnium oxide, aluminum or gold, for example. Cap 120 may be formed in the range of 1 nm top several microns thick, such as 100 nm, for example.

Cap 120 may be substantially index matched with higher index material 136, for example. Alternatively, cap 120 may be substantially index matched to lower index material 134. Cap 120 may have a refractive index different from both high index material 136 and lower index material 134. Cap 120 may have a refractive index substantially between higher index material 136 and lower index material 134.

Additional layers may be added into the stack at various locations to provide planarization, protection and index matching as may be desired. These additional layers may take the form of an outer coating. Such an outer coating may be suitable for preventing scratching and protecting from environmental conditions. Outer coating may be substantially index matched with higher index material 136, lower index material 134, base 110, and/or cap 120.

Figure 7:
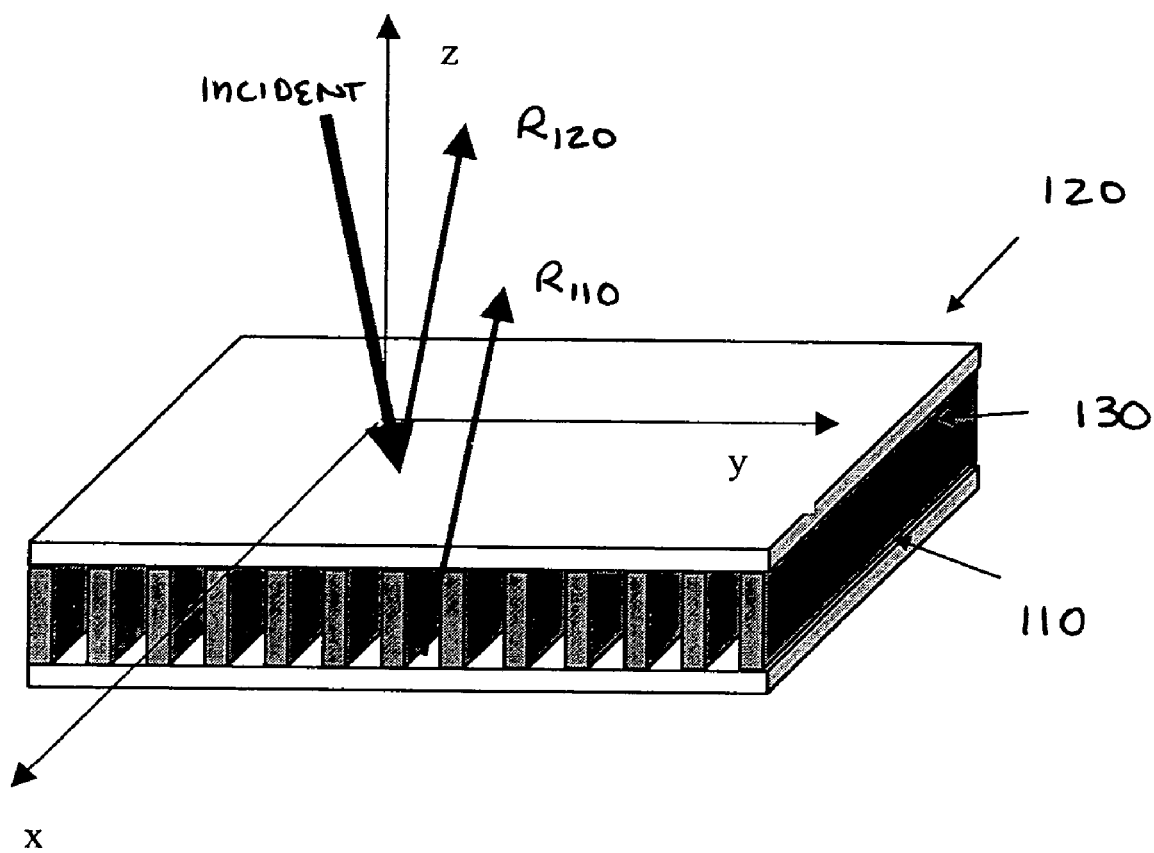
FIG. 7 illustrates the birefringent device of FIG. 1A utilized as a birefringent waveplate according to an aspect of the present invention.

Referring now also to FIG. 7, there is shown the birefringent device of FIG. 1A utilized as a birefringent waveplate. As will be understood by those possessing an ordinary skill in the pertinent arts, electromagnetic radiation incident upon device 100 may encounter cap 120, producing a reflection of some portion $R_{120}$ of the incident electromagnetic radiation and a transmission of some other portion $T_{120}$ (not shown) of the incident electromagnetic radiation. Transmitted radiation $T_{120}$ next encounters subwavelength structure 130, again producing a transmitted portion $T_{130}$ and a reflected portion $R_{130}$. Analogously, the transmitted portion $T_{130}$ is incident upon base 110, thereby producing a reflected portion $R_{110}$ and a transmitted portion $T_{110}$.

The design of base 110 and cap 120 is such that $R_{110}$ and $R_{120}$ may be approximately equal and substantially out of phase. The law of conservation of energy, known to those possessing an ordinary skill in the pertinent arts, in conjunction with the above cancellation, produces an effect akin to that found in anti-reflection coating technology wherein successive reflections substantially cancel out, thereby maximizing the amount of transmitted radiation through device 100.

The design of base 110 and cap 120 may be incorporated into the design of index matching for device 100. As is known to those possessing an ordinary skill in the pertinent arts, thin film anti-reflection coatings generally produce two polarization states with different phase shifts. When the difference becomes large in the case of a planar thin films, it often difficult to find of dielectric stack solutions both for the cap and bottom to enable index matching. According to an aspect of the present invention, the interface between subwavelength structure 130, base 110 and cap 120, each of the two polarization directions may encounter different index changes and the reflected transited amplitudes are different. Use of different phases acquired in the birefringent media may allow for a solution.

Figure 8:
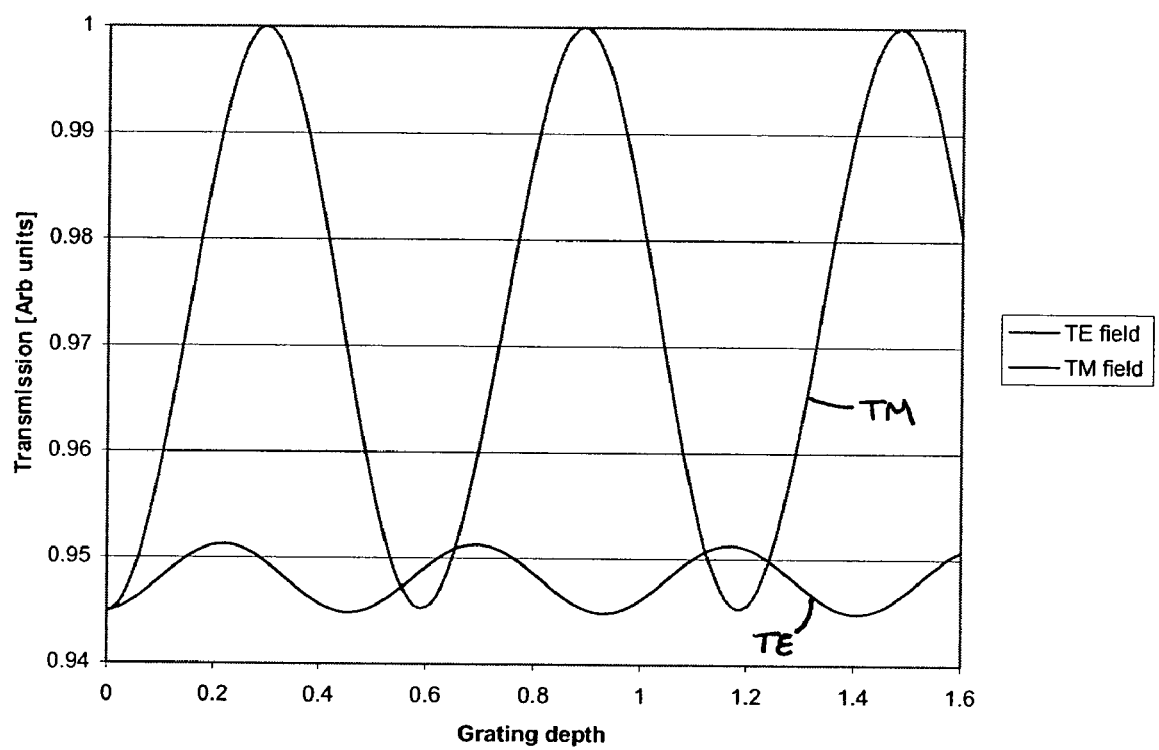
FIG. 8 illustrates the transmission of each polarization through an uncompensated quarter-waveplate according to an aspect of the present invention.

The birefringent waveplate of FIG. 7 may also have anti-reflection coatings on external surfaces as may be desired. As is known to those possessing an ordinary skill in the pertinent arts, anti-reflection coatings and technology may be used to reduce electromagnetic losses at material boundaries. Referring now to FIG. 8, there is shown the transmission of each polarization through an uncompensated quarter-waveplate. As may be seen the transmission associated with the TE field varies from approximately 0.94 to 1.00, while the transmission associated with the TM field varies from approximately 0.94 to 0.95.

Figure 9:
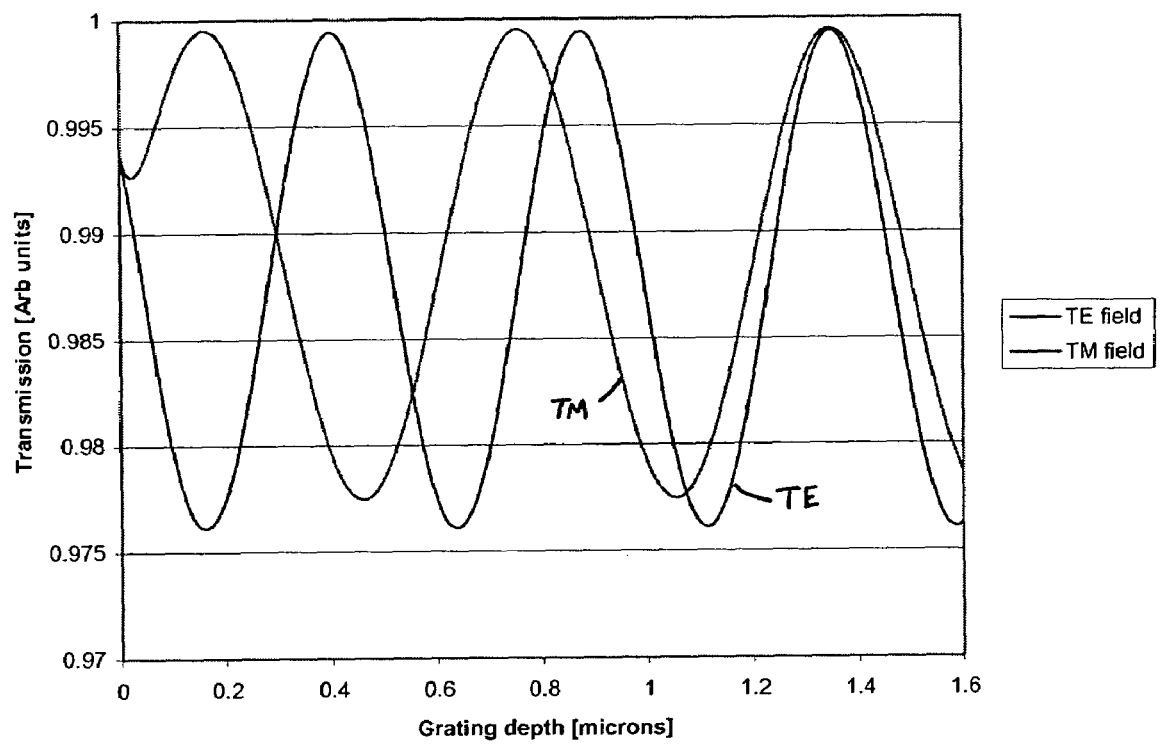
FIG. 9 illustrates the transmission of each polarization through an antireflection compensated quarter-waveplate according to an aspect of the present invention; and, FIG. 10A-10C illustrates a pixel arrayed birefringent device according to an aspect of the present invention.

Referring now to FIG. 9, there is shown the transmission of each polarization through an antireflection compensated quarter-waveplate according to the device of FIG. 7. As may be seen in FIG. 9, the transmission associated with both the TE and TM fields vary from approximately 0.975 to 1.000. As may be realized by those possessing an ordinary skill in the pertinent arts, this may be an important improvement over the transmission discussed and associated with the device of FIG. 8.

For a target depth of 1.4 microns, corresponding to a ¼ wave at 1550 nm, both TM and TE may be overlapped and transmission maximized. Cap layer and bottom layer were optimized that both TM and TE fields will have the same transmission. The ¼ wave phase in one trip and ½ phase in round trip for the light propagating through the grating and reflecting off base 110 may be used in the design to optimize the cap 120 and base 110.

As may be apparent to those possessing an ordinary skill in the pertinent arts, energy, including two distinct polarization components, propagating through device 100 may have one component aligned with the higher refractive index. This alignment may result in a phase difference occurring between the polarization component aligned with the high refractive index as compared to the component aligned with lower refractive index. This realized phase difference corresponds to the distance propagated in device 100, for example the thickness of device 100, and the birefringence, $\Delta n$, of device 100, wherein $\Delta n$ is equal to the difference between nf and no and retardance=$\Delta n$*distance propagated/wavelength.

Referring now to FIG. 2, the relationship between birefringence and refractive index for different filing ratios of the device of FIG. 1A according to an aspect of the present invention is illustrated. As may be seen in FIG. 2, to maximize the resultant birefringence, a filling ratio approximately equal to 0.5 may be desirable. For example, using a refractive index of 4 and a filling ratio of approximately 0.5–0.8, a birefringence of approximately 1.7 may be achieved. Further, for a refractive index of 3 and a filling ratio of approximately 0.5–0.8, a birefringence approaching 1 may be achieved. For a refractive index of 2 and a filling ratio of approximately 0.4–0.7, a birefringence of approximately 0.3 may be achieved.

Figure 3:
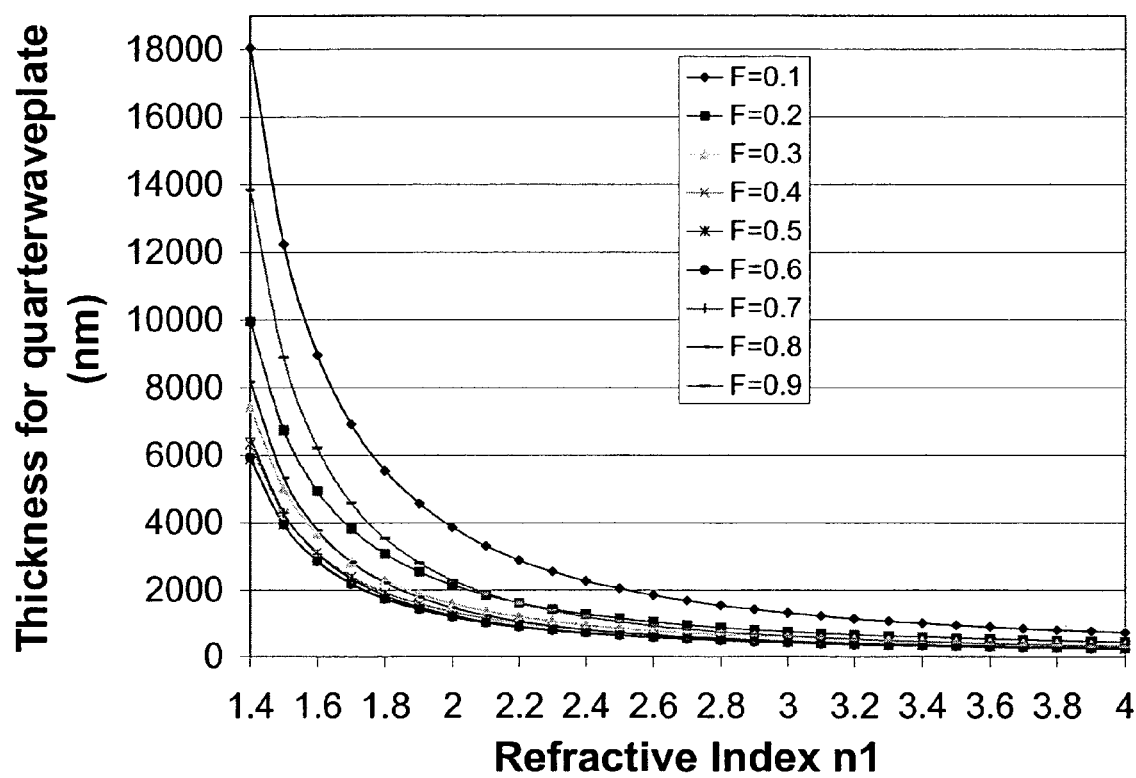
FIG. 3 illustrates the relationship between thickness dependence and refractive index for different filing ratios of the device of FIG. 1A according to an aspect of the present invention.

Referring now to FIG. 3, there is shown the relationship between retardation dependence and refractive index for different filing ratios of the device of FIG. 1A according to an aspect of the present invention. As may be seen in FIG. 3, for a ¼ waveplate at 1550 nm, the figure demonstrates the varied thickness that may achieve this result as a function of the higher index material, and the lower index material is fixed as air. As may be seen in FIG. 3, the thickness for a quarter-waveplate is plotted against the refractive index for various filling ratios. Generally, the larger the thickness for a quarter-waveplate, the smaller the birefringence that is achieved per unit thickness. The variation in filling ratio follows that described above with respect to FIG. 2. Further, it may seen that the greater the refractive index, the greater the birefringence achieved.

Figure 4:
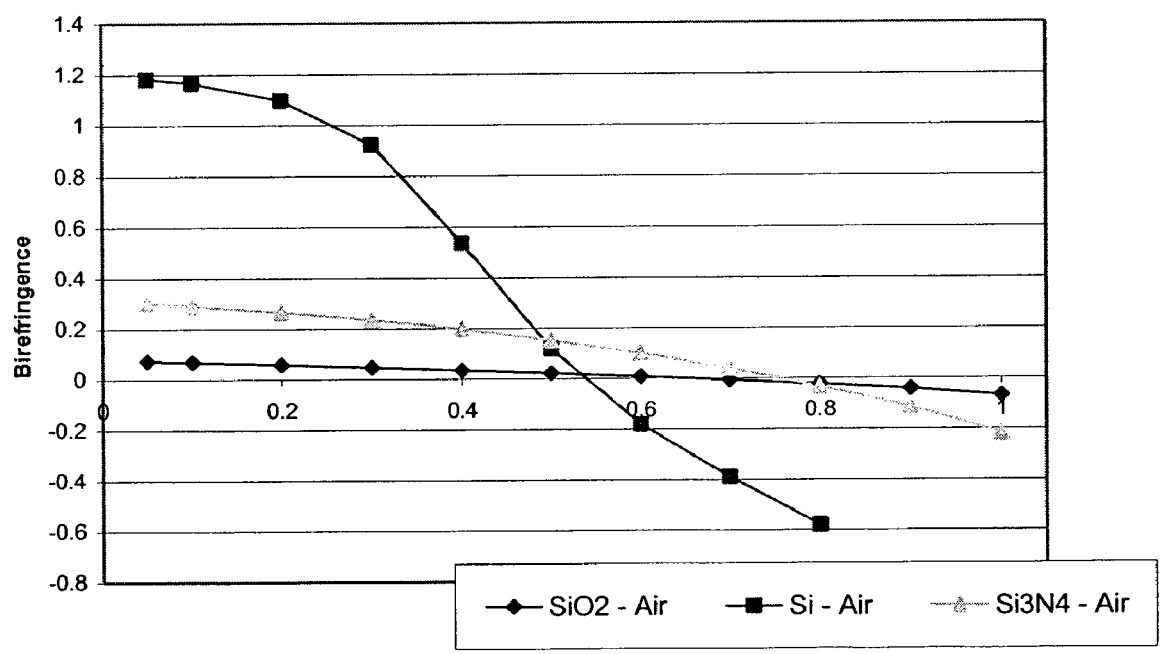
FIG. 4 illustrate the relationship between birefringence and subwavelength structure period for different refractive indices of the device of FIG. 1A according to an aspect of the present invention.

Referring now to FIG. 4, there is shown the relationship between birefringence and the period of subwavelength structure for different refractive indices of the device of FIG. 1A according to an aspect of the present invention. As may be seen in FIG. 4, birefringence depends on the grating period.

Figure 5:
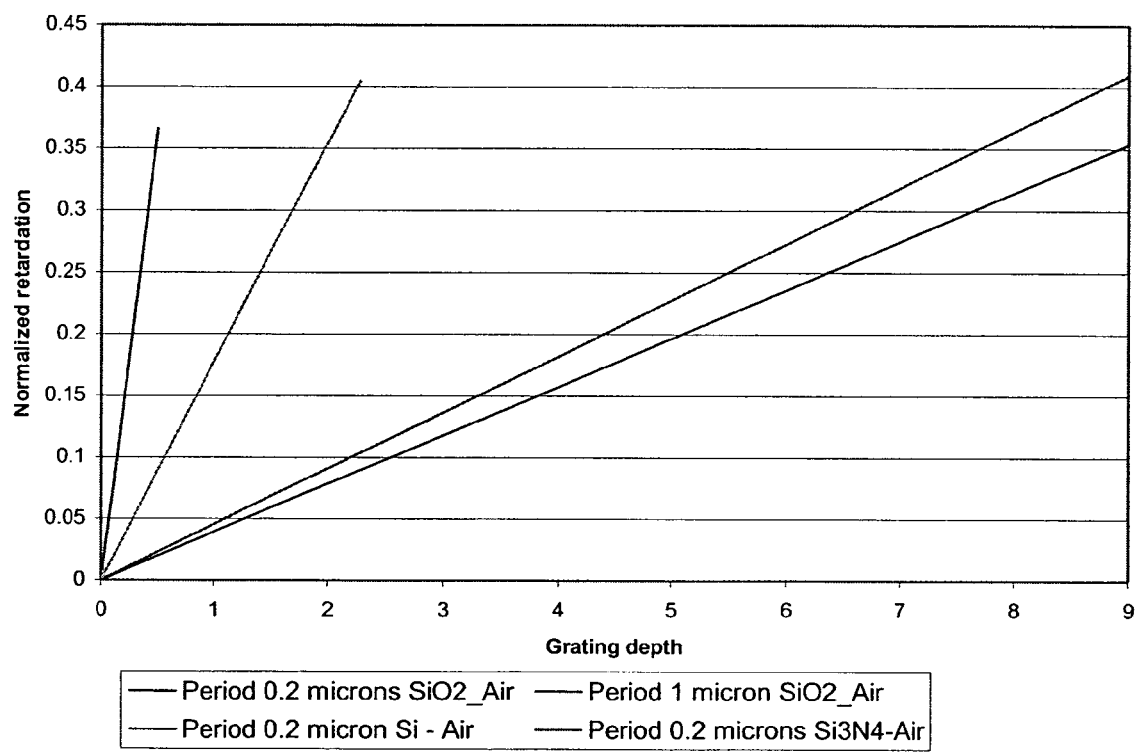
FIG. 5 illustrate the relationship between absolute retardation and subwavelength structure depth for different refractive indices and periods of the device of FIG. 1A according to an aspect of the present invention.

Referring now to FIG. 5, there is shown the relationship between absolute retardation and subwavelength structure depth for different refractive indices and periods of the device of FIG. 1A according to an aspect of the present invention. As may be seen in FIG. 5, to achieve a quarter-waveplate at a wavelength of 1.5 um, utilizing a period of 0.2, may require a grating depth of approximately 0.4 microns for device 100 made from Si and air, approximately 1.4 microns for device 100 made from $Si_3N_4$ and air, or approximately 6.2 microns for device 100 made from $SiO_2$ and air.

Figure 6:
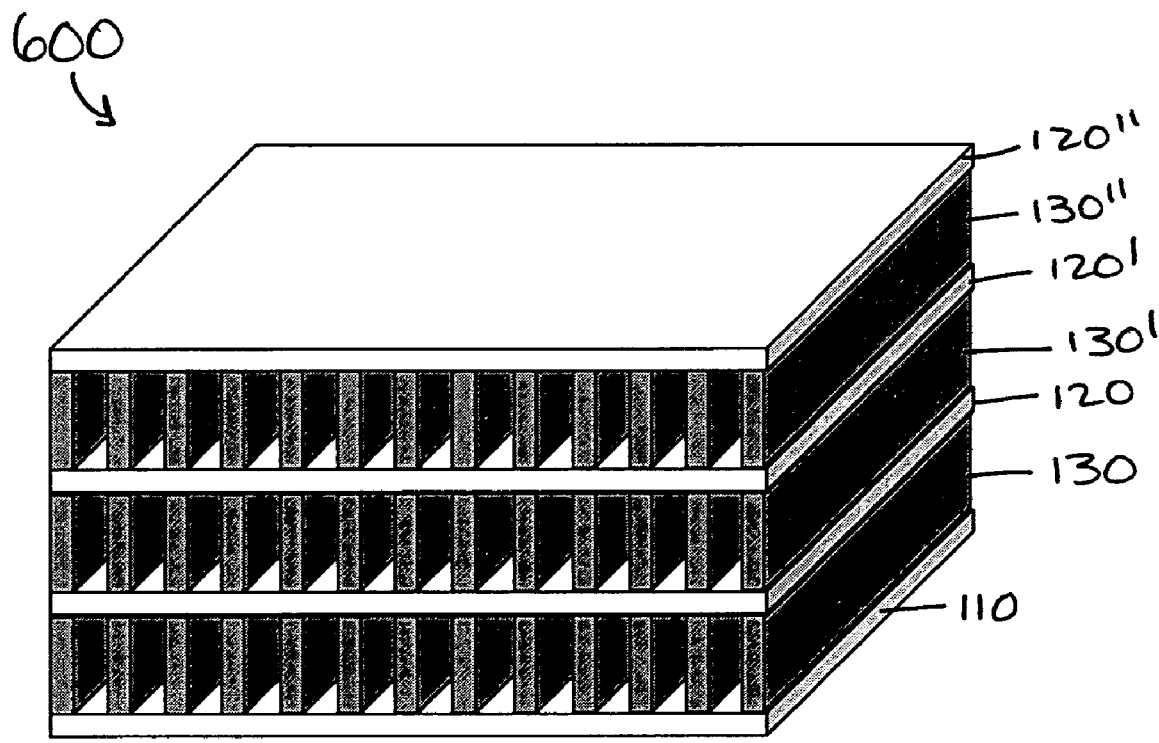
FIG. 6 illustrates a stack of birefringent devices of FIG. 1A according to an aspect of the present invention.

Referring now to FIG. 6, there is shown a stacked waveplate 600 according to an aspect of the present invention. Stacked waveplate 600 may include a base 110, a cap 120, and a subwavelength structure 130 substantially therebetween, each of which is discussed at length hereinabove. Stacked waveplate 600 may further include a second subwavelength structure 130' and a second cap 120', thereby arranged in a stacked relationship creating a multilevel stacked waveplate. This second level may utilize the first level cap 120 as base 110' or alternatively may also include a base 110' (not shown) stacked substantially adjacent to cap 120. A third level of subwavelength structures may be added similarly, as shown in FIG. 6. This third level may include a third subwavelength structure 130'' and a third cap 120''. This third level may utilize, as was the case between the second and first levels, the second level cap 120' as base 110'' or alternatively may also include a base 110'' (not shown) stacked substantially adjacent to cap 120'. While FIG. 6 demonstrates the use of three levels of birefringent devices in a stacked configuration, any number of levels, such as two or more than three, may be used. Similarly, while multiple levels of caps, bases, and subwavelength structures are utilized, each need not be the same as any other cap, base, or subwavelength structure respectively. Further, subwavelength structures 130, 130' and 130'' (and any other additional subwavelength structures $130^n$ not shown) need not be either co-aligned with respect to each other or made from the same materials, but may be. Further subwavelength structures 130, 130' and 130'' may be rotated with respect to each other, for example subwavelength structure may be rotated 90 degrees with respect to subwavelength structure 130'. In addition to enhanced optical characteristics such as being able to optimize desired birefringence, such a design may produce desirable structural stability. As may be realized by one possessing an ordinary skill in the pertinent arts, the stacked retardation regions may have different birefringence. For example, the overall birefringence may decrease with increasing stack layers. This may produce a gradient of birefringence, since the increase may be gradual or abrupt. According to this aspect of the present invention, a three dimensional control of the refractive index may be utilized to create three-dimensional customized birefringent structures. This customization may allow integration of multiple discrete components into a single chip.

Figure 6A:
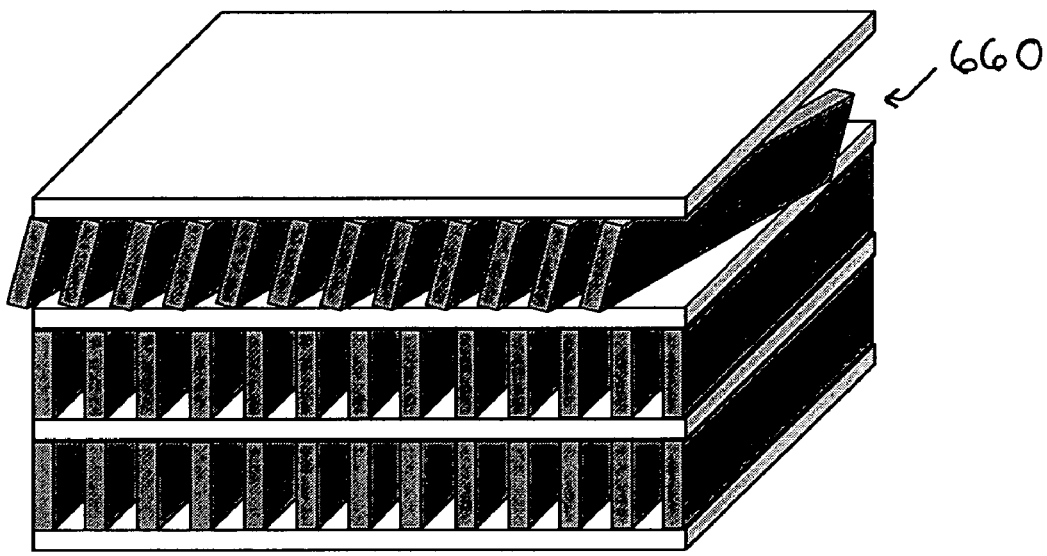
FIG. 6A illustrates a tilted stack of birefringent devices of FIG. 1A according to an aspect of the present invention.

Referring now also to FIG. 6A, there is shown a tilted stack of birefringent devices of FIG. 1A according to an aspect of the present invention. Similar to the structure shown in FIG. 6, stacked waveplate 650 may include a base 110, a cap 120, and a subwavelength structure 130 substantially therebetween, each of which is discussed at length hereinabove. Similarly, subsequent layers may be included. As may be seen in FIG. 6A, at least one layer of subwavelength structures 130 may be tilted with respect to base 110, cap 120, or other subwavelength structure 130. This titling may offer additional design capabilities not found in the device of FIG. 6.

Referring now to FIG. 10A, there is shown a pixel arrayed birefringent device 1000. Device 1000 may include a two-dimensional pixel structure suitable for replacing the grid shown in FIG. 1B, as used in device 100, according to an aspect of the present invention. Device 1000 may include pixel regions 1010, such as a grid as shown, with different principal axis orientations. As may be seen in FIG. 10C, if pixel orientations are not specifically controlled, multiple arbitrary orientations may result—a somewhat random result. Structures with pixels smaller that then propagating wavelength may be used for beam depolarizers. On the other hand, if certain pixel orientations are desired, these may be configured thereby regionalizing the optical properties with each different pixel. In such a configuration, each pixel may react optically different. Structures with pixels exceeding the beam diameter may be used to impose different phase information of parallel propagating beams, which may provide building blocks for optical function integration, for example. Various pixel orientations may be seen in FIG. 10B. As may be seen in FIG. 10B, there may be a vertical orientation, a horizontal orientation, a 45-degree clockwise orientation or a 45-degree counter-clockwise orientation. While these four orientations are shown as examples, other orientations may also be configured, such as any angle rotation.

Operationally, each pixel represents a different optical performance, thereby creating the capability of having a pixel or positionally varied birefringent device. Further, through the use of these localized pixel regions, the birefringence may be tailored to suit particular needs and performance.

Pixelized arrays may be fabricated using photo masks to shadow regions, while leaving other regions exposed for patterning. Such a process may be combined with vertical layer growth. Lithographic techniques such as contact or photo-lithography or direct e-beam lithography may be used to pattern exposed regions.

Those of ordinary skill in the art may recognize that many modifications and variations of the present invention may be implemented without departing from the spirit or scope of the invention. Thus, it is intended that the present invention covers the modification and variations of this invention provided they come within the scope of the appended claims and their equivalents.

What is claimed is:

1. A birefringent device of substantially uniform thickness less than about 10 microns, suited to propagate an incident radiation and being suitable for operating in a wavelength range about a central wavelength, said device comprising:
   a base substrate;
   a layer of periodic index regions of alternating refractive indices applied to a first surface of said base substrate, said layer having a periodicity of less than the central wavelength, said layer of periodic index regions of alternating refractive indices causing birefringence; and,
   a cap layer having an optical thin film and being located substantially adjacent to said layer distal to said base substrate,
   wherein said device is suitable to produce phase retardation.

2. The device of claim 1, wherein said base substrate includes at least one optically active material.

3. The device of claim 2, wherein said base substrate comprises a metallic mirror.

4. The device of claim 2, wherein said base substrate comprises at least one dielectric material.

5. The device of claim 2, wherein said cap layer includes at least one optically active material.

6. The device of claim 5, wherein said cap layer comprises a metallic mirror.

7. The device of claim 5, wherein said cap layer comprises a dielectric material.

8. The device of claim 1, wherein said layer of periodic index regions of alternating refractive indices includes alternating dielectric strips suitable as a high index material and air gaps suitable as a low index material.

9. The device of claim 1, wherein said layer of periodic index regions includes at least one region of tunable indices.

10. The device of claim 9, wherein said at least one region includes liquid crystals.

11. The device of claim 10, wherein said at least one region is substantially aligned perpendicularly to the direction of alternation of refractive indices.

12. The device of claim 10, wherein said liquid crystals are suitable for tuning by applying a voltage.

13. The device of claim 1, wherein said base substrate, said cap layer, and the high refractive index of said layer are substantially index matched.

14. The device of claim 1, further comprising an outer coating.

15. The device of claim 14, wherein said outer coating is suitable for protecting the device from at least one of environmental exposure and scratching.

16. The device of claim 14, wherein said outer coating is index matched with at least one of said base substrate and said cap layer.

17. The device of claim 1, wherein said layer of periodic index regions includes a high refractive index at least twice the low refractive index.

18. The device of claim 1, wherein said layer of periodic index regions includes a high refractive index at least thrice the low refractive index.

19. The device of claim 1, wherein at least one of said base substrate, said layer of periodic index regions, and said cap layer are designed to modify the back reflected portion of the electromagnetic radiation incident upon the device.

20. The device of claim 19, wherein said base substrate, said layer of periodic index regions, and said cap layer are designed such that the back reflected portions of the incident radiation substantially cancel.

21. The device of claim 20, wherein substantially canceling comprises an overall reflection of less than about 5 percent of the incident radiation.

22. The device of claim 20, wherein substantially canceling comprises an overall reflection of less than about 2.5 percent of the incident radiation.

23. The device of claim 20, wherein substantially cancel refers to an overall reflection of less than about 1 percent of the incoming radiation.

24. The device of claim 1, further comprising at least one anti-reflection coating on said base substrate distal to said layer of periodic index regions.

25. The device of claim 24, further comprising at least one anti-reflection coating on said cap layer distal to said layer of periodic regions.

26. The device of claim 1, wherein said alternating refractive indices alternates in at least one-dimension.

27. The device of claim 1, wherein said alternating refractive indices alternates in at least two-dimensions.

28. The device of claim 1, further comprising at least a second layer of periodic index regions of alternating high and low refractive indices applied to a surface of said cap layer distal to said layer of periodic index regions, said second layer having a periodicity of less than the central wavelength; and at least a second cap layer located substantially adjacent to said second cap layer distal to said cap layer.

29. The device of claim 1, wherein said layer of periodic index regions is substantially pixelized, and suitable for selectively orienting at least one given pixel to at least one preferred orientation.

30. The device of claim 1, further comprising at least one etch stop positioned substantially adjacent to said base substrate and suitable for controlling formation of said layer of periodic index regions.

* * * * *

UNITED STATES PATENT AND TRADEMARK OFFICE
CERTIFICATE OF CORRECTION

| | | |
|---|---|---|
| PATENT NO. | : 7,050,233 B2 | Page 1 of 1 |
| APPLICATION NO. | : 10/633372 | |
| DATED | : May 23, 2006 | |
| INVENTOR(S) | : Anguel Nikolov et al. | |

It is certified that error appears in the above-identified patent and that said Letters Patent is hereby corrected as shown below:

TITLE PAGE

The second Inventor's name should read as follows:

[75]    Jian WANG, Orefield, PA (US)

Signed and Sealed this

Twenty-second Day of August, 2006

JON W. DUDAS
*Director of the United States Patent and Trademark Office*